Dec. 27, 1966  G. LOEWENBERG ETAL  3,294,886
CASTING FILMS OR SHEETING OF POLYVINYL CHLORIDE
Filed Dec. 10, 1964
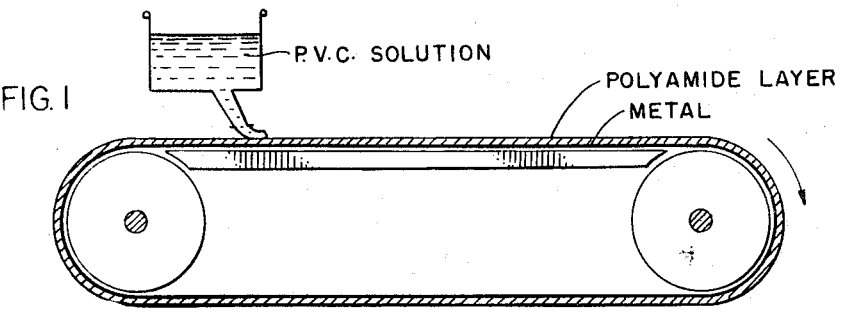
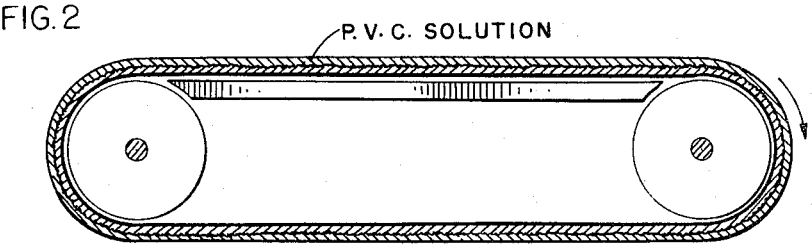
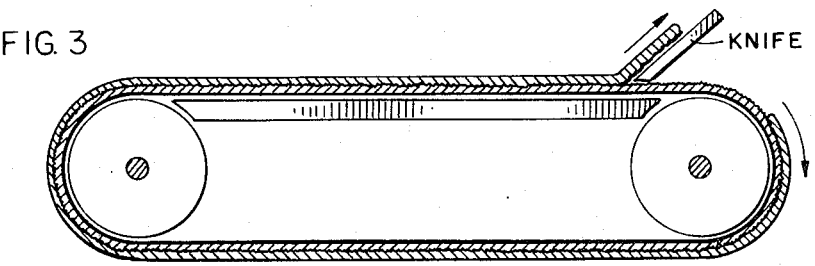
INVENTORS:
GUSTAV LOEWENBERG
HERBERT WAGNER
BY: Marzall, Johnston, Cook & Root
ATT'YS 3,294,886
CASTING FILMS OR SHEETING OF POLYVINYL
CHLORIDE
Gustav Loewenberg and Herbert Wagner, Ludwigshafen
(Rhine), Germany, assignors to Badische Anilin- &
Soda-Fabrik Aktiengesellschaft, Ludwigshafen (Rhine),
Germany
Filed Dec. 10, 1964, Ser. No. 417,484
Claims priority, application Germany, Dec. 13, 1963,
B 74,647
2 Claims. (Cl. 264—166)

This invention relates to a process for the production of films or sheeting of polyvinyl chloride in which a solution of polyvinyl chloride is poured onto a roughened layer of polyamide serving as a substrate, the solvent is evaporated and the film or sheeting is stripped off.

The invention is illustrated in FIGURES 1 and 2 as to its disclosed method steps.

It is known the polyvinyl chloride films and sheeting can be cast continuously by pouring solutions of polyvinyl chloride onto casting substrates, preferably onto endless metal bands or metal drums coated with plastics, evaporating the solvent and stripping off the film or sheeting formed. These films and sheeting (hereinafter called films) have a smooth surface and a uniform thickness. They are therefore suitable as support films for recording tapes. In spite of the many advantages of such films, it is desirable to improve their winding properties further and also to lessen their static friction and electrostatic charging.

We have now found that films can be advantageously prepared by casting a solution of polyvinyl chloride onto a casting substrate, evaporating the solvent and stripping off the film by using as the casting substrate a roughened polyamide layer. By polyamide we understand thermoplastic polyamides having recurring carbamoyl groups in the polymer chain.

Polyvinyl chloride films prepared in this way are distinguished by good winding properties and low electrostatic charging. Their static friction is lessened to such an entent that, when they are used as support films for recording tapes, the squeaking sometimes heard when playing tapes on tape recorders is practically precluded.

The casting substrate is advantageously an endless metal band, conveniently an endless copper band, which has been coated with a copolyamide which is soluble or swellable in conventional solvents or swelling agents, such as alcohols having 1 to 4 carbon atoms or a mixture of said alcohols with water, for example a polyamide prepared by polycondensation of a mixture of equal parts of caprolactam, hexamethylene diamine adipate and 4,4'-diaminodicyclohexylmethane adipate. The polyamide is roughened. Roughening may be effected by mechanical treatment. Regard should be had to the fact that in the case of film thicknesses of less than 30 microns, the smooth side of the film may also be changed in an undesirable way. It is also possible to use a polyamide layer which has been roughened by acting upon it on one side with a conventional solvent and/or swelling agent for polyamides.

It is advantageous to use casting substrates which have been treated as follows:

A solution of polyvinyl chloride in tetrahydrofuran, which preferably contains a lower alcohol having three to four carbon atoms (10 to 25%) and water (3 to 10%), is poured uniformly onto the casting substrate with a conventional casting apparatus. The solution is advantageously heated to about 40° C. The depth of roughening of the casting substrate may be influenced by varying the dissolving period, by using different casting temperatures and by choosing different alcohols. In general it should not be more than 2 microns, but in any case never so deep that the smooth surface of the other side of the film is affected. Dissolving period is the period during which the solution having the composition specified above is heated to elevated temperature, for example to 60° C. The cast layer is dried at about 80° C. in a dryer and the white coating formed is stripped off from the polyamide.

Tendency of the tapes to squeak may be determined by the friction coefficient of the reverse side of the tape against felt. Squeaking is to be observed when the friction coefficient is more than 0.34.

Films of polyvinyl chloride prepared according to this invention are particularly suitable as backing for recording tape.

The invention is illustrated by the following example. Parts specified in the example are by weight unless otherwise stated.

*Example*

For the production of a cast film of polyvinyl chloride, a casting substrate is used which has been treated as follows:

A mixture of 72.2 parts of tetrahydrofuran, 13 parts of n-propanol and 8.7 parts of distilled water is cooled to 10° C. and then 6.1 parts of polyvinyl chloride (K-value 70, prepared by the suspension method) is added. The mixture is stirred, heated to 60° C. and kept at this temperature for thirty minutes. The solution is cooled to 40° C. and then poured by a conventional method onto a copper band which has been coated with a copolyamide of equal parts of caprolactam, hexamethylene diamine adipate and 4,4'-diaminodicyclohexylmethane adipate. The casting is dried in a dryer at 80° C. and the white polyvinyl chloride film formed is stripped off from the copolyamide which now has a rough surface.

Films of polyvinyl chloride are then cast on the roughened polyamide layer in the conventional way. These films may advantageously be processed into recording tapes by coating the smooth side with the magnetic layer. When the winding properties of such tapes are tested, they wind cleanly, even when wound up rapidly (quick rewind), the individual layers of tape lying exactly upon one another. Their friction coefficient (which is a measure of squeaking) is 0.31 (measured on the rough reverse side against felt). As a comparison, the friction coefficient of a recording tape having a smooth reverse side is 0.45. Electrostatic charge (also measured on the reverse side of the recording tape) is 0 to $3 \times 10^5$ v./m. with the film roughened (matted) according to the invention and 6 to $9 \times 10^5$ with a smooth film.

We claim:
1. A process for the production of a casting substrate for the formation of polyvinyl chloride film having one side roughened which comprises: pouring a solvent solution of polyvinyl chloride in tetrahydrofuran containing

10 to 20% by weight of a lower alcohol having from 3 to 4 carbon atoms and from 3 to 10% by weight of water uniformly onto an endless metal band coated with a polyamide having recurring carbamoyl groups in the polymer chain; maintaining said solution in contact with said polyamide coating at an elevated temperature to cause a roughening of said coating due to the dissolving action of said solution; evaporating the solvent; and stripping the formed film from the polyamide layer.

2. A process as in claim 1 wherein said polyamide is prepared from equal parts of caprolactam, hexamethylene diamine adipate and 4,4'-diaminodicyclohexylmethane adipate.

References Cited by the Examiner

UNITED STATES PATENTS 1,981,472  11/1934  Schneider _____ 264—337
2,965,946  12/1960  Sweet _____ 264—337

OTHER REFERENCES

German printed application, Hermann, K 26,660 Nov. 15, 1956, 2 pages of specification, no drawing.

ROBERT F. WHITE, *Primary Examiner.*

R. B. MOFFITT, *Assistant Examiner.*